(12) United States Patent
Bochinger et al.

(10) Patent No.: US 8,454,878 B2
(45) Date of Patent: Jun. 4, 2013

(54) DEVICE FOR PRODUCING A COMPONENT AND METHOD AND COMPONENT

(75) Inventors: Marc Bochinger, Elmshorn (DE); Klaus Edelmann, Bremen (DE); Thomas Lange, Delmenhorst (DE); Tanja Frese, Horstedt (DE); Sven Sperling, Schwanewede (DE); Eugen Tschakrow, Voehl (DE); Tobias Wirtz, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 54 days.

(21) Appl. No.: 12/906,543

(22) Filed: Oct. 18, 2010

(65) Prior Publication Data

US 2011/0115128 A1 May 19, 2011

Related U.S. Application Data

(63) Continuation of application No. PCT/EP2009/053945, filed on Apr. 2, 2009.

(60) Provisional application No. 61/125,159, filed on Apr. 23, 2008.

(30) Foreign Application Priority Data

Apr. 23, 2008 (DE) .......................... 10 2008 020 347

(51) Int. Cl.
*B27N 3/18* (2006.01)
(52) U.S. Cl.
USPC ........... 264/319; 264/322; 425/397; 425/395; 425/403.1; 249/170; 249/171; 249/187.1
(58) Field of Classification Search
USPC ........ 425/397, 395, 403.1, DIG. 48; 264/319, 264/322; 249/170, 171, 187.1
See application file for complete search history.

(56) References Cited

U.S. PATENT DOCUMENTS 2,448,492 A * 8/1948 Mayne .......................... 264/311
4,190,996 A 3/1980 Schindler et al.
(Continued)

FOREIGN PATENT DOCUMENTS

DE 10153035 A1 5/2003
(Continued)

OTHER PUBLICATIONS

German Office Action from DE 10 2008 020 347.5 dated Dec. 15, 2008.
International Search Report and Written Opinion for PCT/EP2009/053945 dated Jul. 13, 2009.

*Primary Examiner* — Joseph S Del Sole
*Assistant Examiner* — David N Brown, II
(74) *Attorney, Agent, or Firm* — Jenkins, Wilson, Taylor & Hunt, P.A.

(57) ABSTRACT

The invention relates to a device for the production of an angle for connecting a fuselage cell skin to an annular former and/or a stringer inside a fuselage cell structure of an aircraft, the angle taking place by the one-step deformation of an initially planar blank along at least three fold lines in a uniaxial compression molding device. A mounting frame with hinges is arranged in the compression molding device, the blank to be deformed being accommodated along the edges preferably by means of a plurality of peripherally arranged springs. A deformation of the blank into an auto-stabilized angle is possible in one step while simultaneously ensuring interlaminar slide. Due to the constructively conditioned auto-stabilization of the angle, additional components which increase the weight and the assembly effort (so-called "stabilos") in the connection region between fuselage cell skin, stringers and annular formers inside a fuselage structure of an aircraft are unnecessary.

20 Claims, 4 Drawing Sheets

U.S. PATENT DOCUMENTS

| | | | | |
|---|---|---|---|---|
| 4,744,848 A | * | 5/1988 | Andrews et al. | 156/224 |
| 4,925,615 A | * | 5/1990 | Willis et al. | 264/257 |
| 6,454,557 B1 | * | 9/2002 | Chun et al. | 425/397 |
| 2002/0056943 A1 | | 5/2002 | Bibeau | |
| 2003/0017227 A1 | * | 1/2003 | Bibeau | 425/383 |
| 2003/0219554 A1 | * | 11/2003 | Wang | 428/34.1 |

FOREIGN PATENT DOCUMENTS

| | | |
|---|---|---|
| DE | 10259883 A1 | 6/2004 |
| FR | 2374158 A1 | 7/1978 |
| WO | WO 99/38683 A1 | 8/1999 |
| WO | WO 2009/019083 | 2/2009 |

* cited by examiner

DEVICE FOR PRODUCING A COMPONENT AND METHOD AND COMPONENT

CROSS-REFERENCE TO RELATED APPLICATIONS

This application is a continuation of PCT/EP2009/053945 filed Apr. 2, 2009 and claims the benefit of U.S. Provisional Application No. 61/125,159, filed Apr. 23, 2008 and German Patent Application No. 10 2008 020 347.5, filed Apr. 23, 2008, the entire disclosures of which are herein incorporated by reference.

FIELD OF THE INVENTION

The invention relates to a device for the production of a component, in particular an angle for connecting a fuselage cell skin to an annular former of an aircraft, the component being deformed in a compression moulding device by the one-step deformation of a planar blank along at least three fold lines, the blank being formed using a fibre-reinforced thermoplastic plastics material.

The invention also relates to a method for the production of a component of this type by means of the device and to such a component, in particular an auto-stabilised angle.

In the conventional aluminium section construction method, the fuselage airframes of aircraft are generally produced from a plurality of fuselage sections which are arranged in tandem and are connected by encircling transverse seams, the at least two shell segments being connected in each case by longitudinal seams. In order to reduce weight, the fuselage sections or the shell segments are produced to an increasing extent from composite materials, in particular carbon fibre reinforced plastics materials (CFRP). In this construction method, a CFRP fuselage cell skin is reinforced internally by annular formers which are also formed using CFRP profiled parts. CFRP longitudinal reinforcing profiled parts ("stringer profiles") are arranged parallel to the longitudinal expanse of the fuselage section on an internal surface of the fuselage cell skin, being uniformly distributed over the periphery thereof. During the production of the CFRP fuselage cell skin, the stringer profiles can be formed integrally therewith. The connection between the annular formers and the fuselage cell skin is performed using angles (so-called "clips"). These angles substantially have one side for resting against the annular former, one side for resting against the fuselage cell skin and one angle for connecting the stringer. The connection of the angles to the annular formers and to the fuselage cell skin can selectively be made by adhesive bonding, riveting, screwing, welding, or by a combination of these methods.

In order to avoid corrosion problems in the contact region between the aluminium angles, the CFRP annular formers and the CFRP fuselage cell skin and also to further reduce the weight, instead of being produced from canted aluminium sheet plates, the angles are also produced using a fibre-reinforced plastics material. Since the production of the angles which are required in very large piece numbers (up to 10,000 pieces per aircraft, depending on type) using carbon fibre reinforced thermosetting plastics materials is too time-consuming due to the necessary curing procedures, plate-shaped semi-finished products are used which are formed using carbon fibre reinforced thermoplastics.

During the deformation of such plate-shaped semi-finished products consisting of fabric-reinforced thermoplastics, unlike conventional sheet-metal forming, it is desirable to produce (shape and consolidate) the component in a single deformation step to avoid repeated heating. First of all, the entire blank is heated and, after the melting temperature has been surpassed, it is reshaped and consolidated into the finished component by means of an upper die and a lower die positioned in a moulding press. In this respect, using a uniaxial moulding press, it is possible to only produce deformations for which the linear closing movement of the upper die onto the lower die ensures that the plasticised carbon fibre reinforced thermoplastic material is brought into the desired position. This requirement greatly restricts the design of the component. If, in respect of the component, a constructive specification requires a plurality of successive deformation steps, for example, which can be easily carried out in the case of aluminium sheet-metal forming, hitherto this has been impossible to implement in the case of fibre reinforced thermoplastic plates, because the entire component has to be completely melted, i.e. plasticised and during the subsequent shaping process (compression moulding), is completely consolidated again. i.e. all the surfaces of the workpiece have to be subjected to a sufficiently high pressure.

It is also to be considered that during the deformation of thermoplastic semi-finished products, the so-called "interlaminar slide" necessarily takes place, in other words the superimposed fibre layers in the carbon fibre reinforced thermoplastic plate move relative to one another, caused by the deformation radii which are different internally and externally in each case. Consequently, the course and the integrity of the fibre reinforcement can be impaired during deformation.

Furthermore, the blank is to be deformed into a so-called "auto-stabilised" angle which is capable of absorbing forces which also arise in the longitudinal direction of the aircraft. This measure avoids the necessity of an additional stabilisation element (so-called "stabilo") for each individual angle, which adds to the weight and assembly effort.

SUMMARY OF THE INVENTION

It is therefore the object of the invention to produce from planar, plate-shaped blanks of a fibre-reinforced thermoplastic plastics material, complex three-dimensional components, in particular auto-stabilised, one-piece, corrosion-resistant angles (so-called "clips") in a one-step deformation process using in particular a uniaxial moulding press which comprises an upper die and a lower die.

This object is firstly achieved by a device for the production of a component, in particular an angle for connecting a fuselage cell skin to an annular former of an aircraft, wherein the component is deformed in a compression moulding device by the one-step deformation of a planar blank along at least three fold lines, the blank being formed from a fibre-reinforced thermoplastic plastics material, wherein a mounting frame is arranged between a lower die and an upper die and the blank is secured in the mounting frame, the mounting frame being formed by at least two segments and the at least two segments being articulated together by at least one hinge, and it being possible for the mounting frame to be applied on the lower die by pivoting the at least two segments.

Due to the fact that a mounting frame having at least one hinge is arranged between a lower die and an upper die and the blank is secured, in particular suspended in the mounting frame, the initially planar blank can be deformed into an auto-stabilised angle in one go or in one deformation step in a simple, uniaxial compression moulding device, the three resulting fold lines intersecting one another at an angle of approximately 90°. In this arrangement, absolutely no fold formation occurs and the course or integrity of the reinforcing fibre arrangement in the thermoplastic blank is not at all impaired, so that the subsequent angle has ideal static characteristics. The blank is separated, for example from a preferably carbon fibre reinforced thermoplastic plate (so-called "organo-sheet"). In particular, high performance thermoplastic polymers, for example polyether ether ketone (PEEK), polyetherimide (PEI), polyether ether ketone (PEKK), polyphenylene sulphide (PPS) or any combinations thereof are suitable for the formation of the thermoplastic matrix which encloses the fibre reinforcement.

According to an advantageous embodiment, the blank is suspended in the mounting frame by a plurality of resilient elements, in particular (tension) springs. Due to the peripheral resilient suspension of the blank, it can be simultaneously deformed in a plasticised state without the risk of a fold formation along three fold lines which are approximately vertical to one another, the interlaminar slide not being hindered and an optimum mechanical strength and component tolerance being produced.

A further advantageous development of the device provides that the mounting frame is formed with at least two segments, said segments being articulated together by at least one hinge. As a result of the hinged-segment configuration of the mounting frame, said frame can be applied in an exactly fitting manner on the lower die by the pivoting of the individual segments. In a so-called "original state" of the mounting frame, all the segments are located in one plane, while in the so-called "moulding state", the segments are tilted or pivoted relative to one another by the hinges such that said segments are substantially able to follow a peripheral contour of a lower die.

According to a further embodiment, the segments are each configured in an approximate L shape. Consequently, assuming that the segments are pivoted appropriately in relation to one another, they can be positioned against the lower die on all sides, the shape of which substantially corresponds, for example to a trilateral pyramid.

Further advantageous embodiments of the device are set out in the further claims.

Furthermore, the object according to the invention is achieved by a method which has the following steps:
a) introduction of a planar blank, formed using a fibre-reinforced thermoplastic plastics material, into a mounting frame which has at least one hinge,
b) heating of the blank,
c) positioning of the mounting frame which has at least one hinge on a lower die, the mounting frame being applied on the lower die by pivoting the segments, and
d) pressing together of the lower die and an upper die in a compression moulding device.

The procedural method described above allows the production of an auto-stabilised angle from a planar blank in a one-step deformation process using a simple, in particular uniaxial compression moulding device.

At the end of the deformation procedure, the angle is shaped into a predetermined desired contour by trimming or edging. In so doing, the oblique edges which are produced as a result of the interlaminar slide are simultaneously cut at an angle and the edge region with the (retaining) holes required for suspending the (tension) springs is cut off. Finally, the attachment holes can then be introduced into the angle, for example by machining operations. Alternatively, this can also be carried out before the deformation operation. It is also possible to carry out both the trimming operation of the ready deformed angle and the introduction of the attachment holes by non-cutting processes, for example using laser beam or water jet cutting methods.

A component is produced by means of the method. Due to the fact that the auto-stabilised angle is formed using a fibre-reinforced thermoplastic plastics material, first of all corrosion problems associated with CFRP components are ruled out. In addition, the use of the auto-stabilised angle provides a considerable potential for reducing weight, with a simultaneously simplified assembly, because additional elements for supporting the annular formers inside the fuselage cell structure of an aircraft are unnecessary due to the auto-stabilising characteristics.

Further advantageous embodiments of the device, the method and the component are set out in further claims.

DESCRIPTION OF EXEMPLARY EMBODIMENTS

Figure 1:
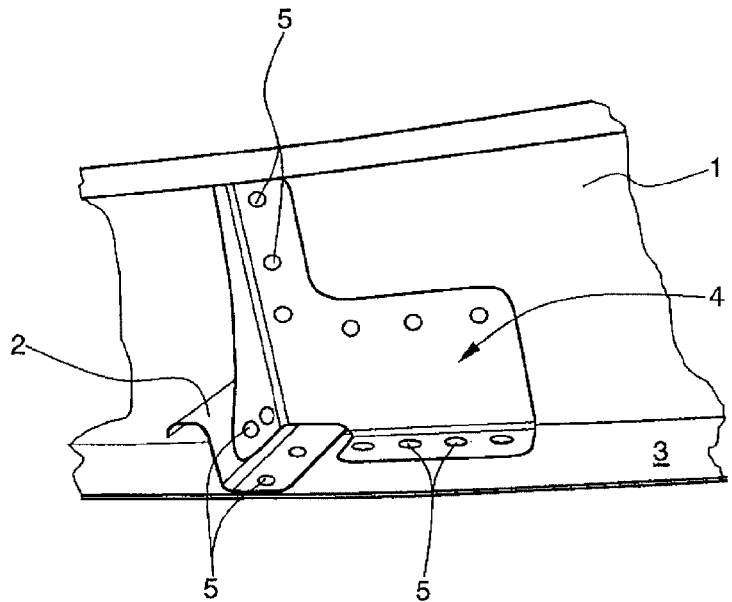
FIG. 1 shows a conventional aluminium connecting angle known from the prior art (a so-called "clip")

In the drawings, the same constructive elements have the same reference numerals in each case.

FIG. 1 shows an (aluminium) angle known from the prior art (a so-called "clip") which is produced by at least one deformation step in a compression moulding device or tilting device from a suitable, high-resistance aluminium alloy material.

An annular former 1, a longitudinal reinforcing element, in particular a stringer 2, as well as a fuselage cell skin 3 inside a fuselage cell structure of an aircraft are respectively connected to one another by an aluminium angle 4 in an intersection region. In the illustrated embodiment, the mechanical connection of the above-mentioned components, with the provision of an intersection point, is achieved by a plurality of rivets 5.

Figure 2:
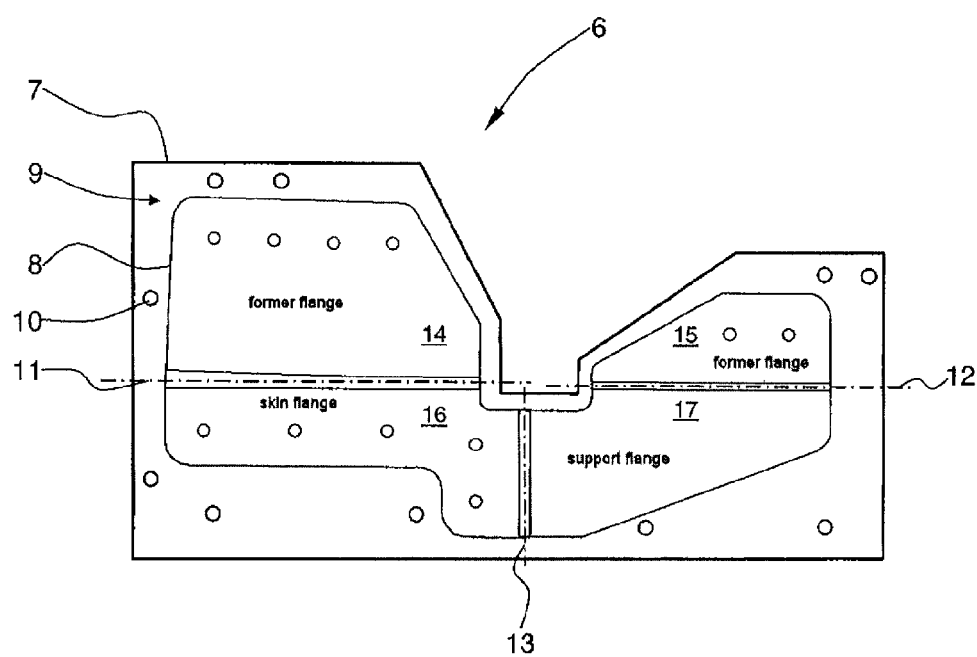
FIG. 2 shows a blank formed using a fibre-reinforced thermoplastic material, for subsequent deformation.

FIG. 2 shows an initially planar blank, formed using a suitable fibre-reinforced thermoplastic material, to be subsequently deformed by the device according to the invention. A blank 6 consisting of a fibre-reinforced plate of an initially planar thermoplastic plastics material, preferably reinforced with carbon fibres has an outer contour 7 which surrounds an inner contour 8 with the formation of an encircling edge region 9. Introduced in the edge region 9 produced between the inner contour 8 and the outer contour 7 is a plurality of (retaining) holes, of which one (retaining) hole has been provided with reference numeral 10 in representation of all further holes located in the edge region 9. The sole purpose of the holes 10 in the edge region 9 is to resiliently suspend the blank 6 in a mounting frame by means of (tension) springs. The holes inside the inner contour 8 are not introduced into the blank 6 or angle until later, that is, at the end of the deformation procedure and they are used for connection to the structural elements of the fuselage cell of the aircraft (formers, stringers, fuselage cell skin).

The blank 6 is deformed along three fold axes or fold lines 11 to 13 which are shown in dot-dash lines. The division of the fold lines 11 to 13 produces two (subsequent) former flanges 14, 15, one (subsequent) skin flange 16 as well as one (subsequent) support flange 17 or stringer flange. The two former flanges 14, serve to connect a former to the angle which is produced by deforming the blank 6, while the skin flange 16 ensures a connection to the fuselage cell skin. The support flange 17 is used to absorb forces which engage in the longitudinal direction of the aircraft, i.e. parallel to the stringers and thus assumes the task of the so-called "stabilos". Furthermore, a connection is possible between the support flange 17 and the stringers, for example by riveting.

Also to be noted are the lines which respectively run on both sides of the fold lines 11 to 13, which are not provided with a reference numeral and indicate the subsequent deformed regions (cf. FIG. 7), the lines running on both sides of the fold line 11 having a curvature such that, in an ideal case, the skin flange 16 which is thus also slightly curved rests against the curved fuselage cell skin with its complete surface in the respective installation site. The fold lines 11, 12 run in a line or are offset slightly parallel to one another, while fold line 13 runs at an angle of approximately 90° to the two fold lines 11, 12.

Figures 3, 4:
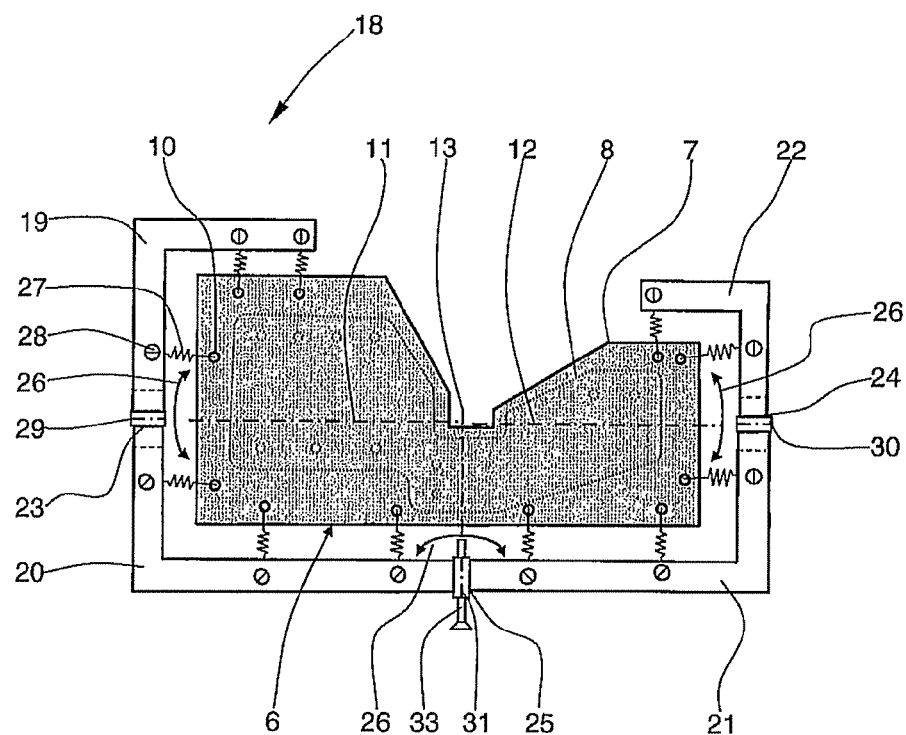
FIG. 3 is a plan view of a mounting frame with a blank suspended therein.
FIG. 4 is a perspective view of a lower die.

FIG. 3 illustrates a mounting frame with the blank 6 from FIG. 2 suspended therein in a planar, unfolded, so-called "original state". The blank 6 is suspended in a resiliently sprung manner in a mounting frame 18. The mounting frame 18 is formed by four portions or segments 19 to 22 which are articulated together by three hinges 23 to 25. The straps of the hinges 23 to 25 are indicated in each case by two dashed lines in the region of the segments. Due to the hinges 23 to 25, the segments 19 to 22 can pivot in the directions indicated by the three dark double arrows 26, in each case by up to 120° relative to one another, the segments 19 to 22 in the original state of FIG. 3 respectively including an angle of 0° relative to one another. Seen from above, each of the four segments 19 to 22 is approximately L shaped and is formed, for example from a metallic planar profiled part with a rectangular cross-sectional geometry.

For the resiliently sprung suspension of the blank 6, preferably a plurality of (tension) spiral springs is used, of which one spring 27 is provided with a reference numeral in representation of the others. The (tension) springs 27 are arranged distributed around the outer contour 7 of the blank 6. To attach the springs 27, screws, for example are used, of which one screw 28 has been provided with a reference numeral. One and of the (tension) spring 27 is secured in the segment 19 of the mounting frame 18 by screw 28, while the other end of the spring 27 directed away therefrom is suspended in the hole 10 in the blank 6. The (tension) springs 27 can also be directly secured in holes in the segments 19 to 22.

The fold lines 11 to 13 approximately coincide with the three pivot axes 29 to 31 of the hinges 23 to 25. The springs are preferably attached to the mounting frame 18 such that no elevations or thickenings are produced on an upper side or a lower side of the mounting frame 18. This can be achieved, for example using countersunk head screws with a machined thread. Alternatively, the screws can also be simultaneously used as distancing elements from the lower die described further below, so that it is not a matter of a flush termination with the mounting frame.

Instead of using the (tension) springs, it is possible to use other resilient elements, for example elastic bands or a combination thereof. Furthermore, non-resilient wires, nails or wires made of memory metals can also be used to attach the blank in the mounting frame 18. The pivot axis 31 of the hinge 25 is configured with a screw 33 having a conical head as a guide means. The guide means is used to exactly align the mounting frame 18 relative to the lower die of the device which is illustrated in FIG. 4 and is described further below. A pin or the like can also serve as a guide means instead of the screw 33. In the "original state" of the mounting frame 18 illustrated in FIG. 3, the two pivot axes 29, 30 include an angle of 0° or 180° to one another, in other words, the mentioned axes 29, 30 run parallel to one another. In contrast thereto, the pivot axis 31 runs at an angle of approximately 90° to the two pivot axes 29, 30.

FIG. 4 is a perspective view of a lower die used for the device.

As can be seen from FIG. 4, the lower die 34 (pyramid base) has approximately the geometric shape of an upper part of a trilateral pyramid with three equally inclined side faces 35 to 37 which are the same size in each case and which, in the illustrated embodiment, each stand vertically against one another and are equilateral triangles. The three side faces 35 to 37 of the lower die converge into an imaginary apex which does not have a reference numeral. Furthermore, attached to the lower die 34 is a removable top part 38 which has three contact surfaces 39 to 41 for the blank 6. Upper end regions of the contact surfaces 39 to 41 approximately form an equilateral tetrahedron, since the contact surfaces 39 to 41 run parallel to the side faces of the lower die 34. The contact surfaces 39 to 41 of the top part 38 can be arranged at an angle to one another which differs slightly from 90°. As a result of this, the contact surfaces 39 to 41 no longer run parallel to the side faces 35 to 37 and it is possible to produce angles with flanges which do not run at an angle of 90° to one another.

Furthermore, both the lower die 34 and the top part 38 can have almost any geometric shape which differs from a tetrahedron, which can equate, for example a region of a superficial geometric shape of a polyhedron, and which allows an undercut-free separation of lower die 34 including top part 38 and upper die. The geometric shape of the upper die (cf. FIG. 6) must follow the shaping of the lower die 34 with the top part 38, and the number and shaping of the articulated segments of the mounting frame 18 must also be adapted thereto.

The top part 38 can be removed from the lower die 34 after attachment means (not shown) have been released. Consequently, when required, the top part 38 can be easily replaced by a top part which has differently arranged contact surfaces, in which top part said contact surfaces run for example at an angle to one another which differs from 90° in order to produce connecting angles of an alternative geometric shape.

The contact surfaces 39 to 41 each run parallel to the side faces 35 to 37. The contact surfaces 39 to 41 define an inner side of the angle to be formed from the planar blank 6. Furthermore, arranged on the side faces 35 to 37 are a plurality of elevated spacers, of which one spacer 42 has been provided with a reference numeral in representation of the others. The purpose of the spacers is to hold the mounting frame 18 evenly at approximately the same level with respect to the side faces 35 to 37 and to the contact surfaces 39 to 41 which form the actual mould surface. For this purpose, the spacers as well as the contact surfaces 39 to 41 have approximately the same height 43 or the same distance to the side faces 35 to 37. Furthermore, two retaining plates 44, 45 are arranged on the side faces 35 and 37. The retaining plates 44, 45 stand vertically on the side faces 35, 37 and serve as "supporting tables" or distancing elements for the mounting frame 18, in particular for segments 20 and 21. Undesignated end portions of the retaining plates 44, 45 have on the inside end edges 46, 47 which run at an angle of 45° and portions of which adjoin one another in a parallel spacing with the formation of a gap 48. On the outside, the end portions of the retaining plates 44, 45 are mitred at right angles, thereby producing a recess 49 with an approximately square shape which facilitates the threading in or introduction into the gap 48 of the screw 33, arranged on the mounting frame 18. The screw 33 which is introduced horizontally into the gap 48 aligns the mounting frame 18 resting on the retaining plates 44, 45 in a precise manner with respect to the lower die 34. For this purpose, there is an easy, slight press locking between the screw 33 and the gap 48. The lower die 34 is preferably formed using an aluminium alloy or a heat-resisting steel alloy.

Figure 5:
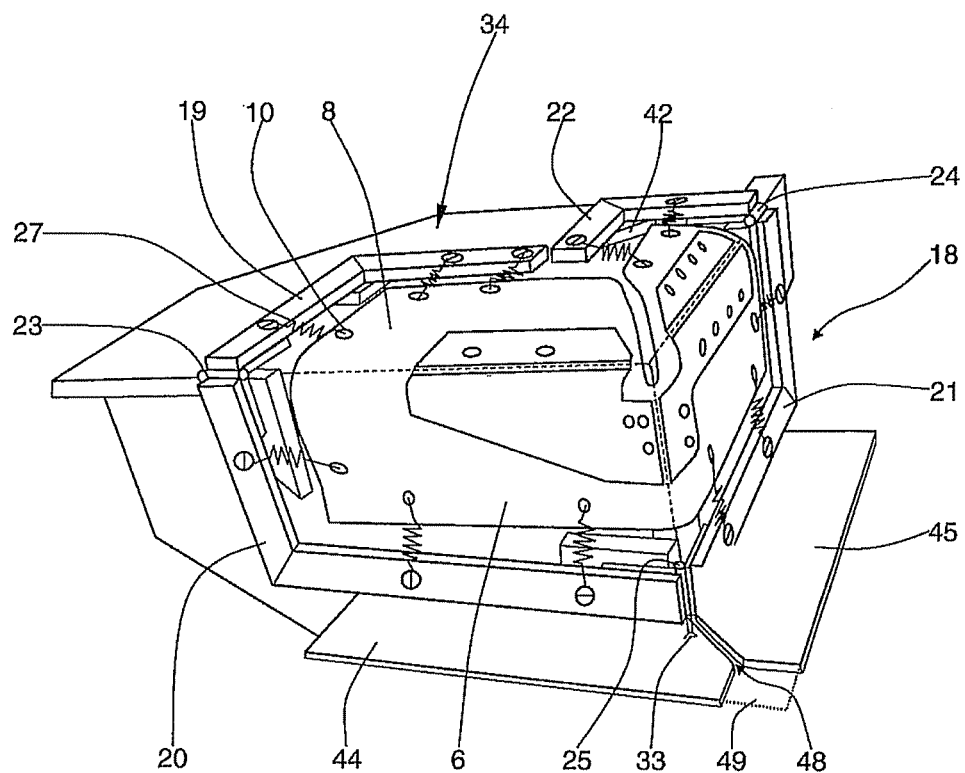
FIG. 5 shows the lower die with the positioned mounting frame and blank.

FIG. 5 shows the lower die from FIG. 4 with the mounting frame resting thereon, the blank which is fully plasticised by heating and is already partially deformed being suspended in a resiliently flexible manner in the mounting frame. FIG. 5 is shown in a view rotated to the right by approximately 90° about the vertical axis (z-axis) with respect to the view of FIG. 4.

The blank 6 is suspended in the mounting frame 18 in a resiliently flexible manner by, for example the (tension) springs. The blank 6 is mounted in a resiliently flexible manner in the mounting frame 18 by a plurality of (tension) springs which are attached at one end to the segments 19 to 22 of the mounting frame 18 and the other ends of the (tension) springs are suspended in each case in holes inside the blank 6. One hole 10 in the blank 6 and a spring 27 suspended therein are provided with reference numerals in representation of all the others.

The mounting frame 18 is preferably positioned on the lower die 34 such that the segments 19 to 22 rest on the at least three elevated spacers of the respective side faces 35 to 37 and are supported in a uniform manner, one spacer 42 being provided with a reference numeral in representation of all the others. Spacer 42 and all the others can alternatively be vertically adjustable in stages or continuously. The vertical adjustability can be achieved, for example by superimposing additional layers having a defined material thickness or using a threaded screw for continuous adjustability. The spacers 42 can be adjusted to a lower height than the contact surfaces 39 to 41 of the top part 38 in order to achieve angles other than 90° between the former flanges 14, 15, the skin flange 16 and the support flange 17. At least portions of the two lower segments 20 and 21 of the mounting frame 18 also rest on the retaining plates 44, 45. The screw 33 which is secured in the stop 32 of the mounting frame 18 is guided in the gap 48 between the retaining plates 44, 45, thereby providing an exact positioning, which can be reliably reproduced in particular for series production of the angles, of the blank 6 in relation to the lower die 34 and particularly in relation to the form-defining contact surfaces 39 to 41 which are obscured in FIG. 5. The outer edges of the form-defining contact surfaces are indicated by three dashed lines which intersect one another at a point at a right angle. The elevated spacers, together with the also elevated contact surfaces (cf. in particular FIG. 4) ensure the same level between the mounting frame 18 and the blank 6. The inner contour 8 is indicated by the encircling dotted line, including the approximate positions of the subsequent attachment holes inside the deformed angle. There is an angle of approximately 90° in each case between the segments 20, 21 and the segments 20, 19 as well as the segments 21, 22 in the "moulding state", shown in FIG. 5, of the mounting frame 18. This angular position of the individual segments 19 to 22 of the mounting frame 18 relative to one another is enabled by the hinges 23 to 25.

Figure 6:
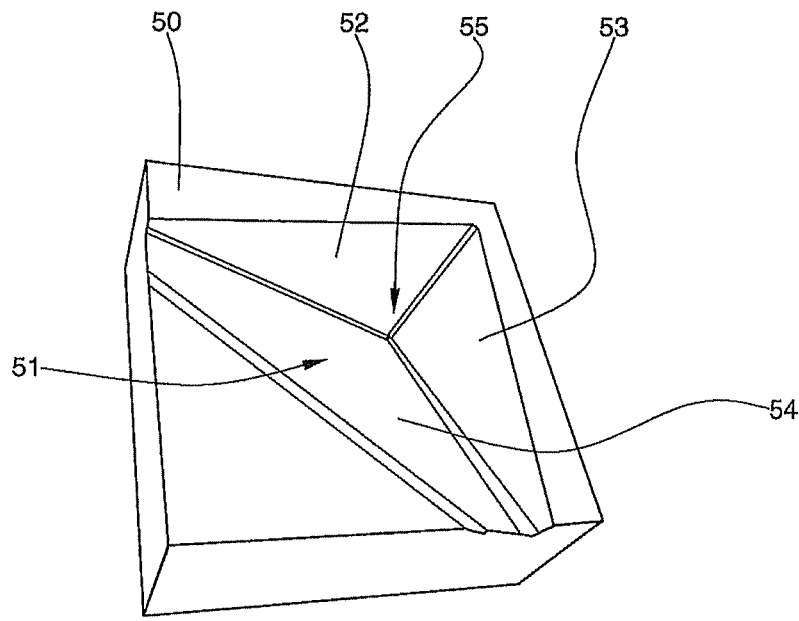
FIG. 6 is a perspective view of an upper die.

FIG. 6 is a perspective view from below of an upper die of the deforming device according to the invention.

An upper die 50 is configured in one piece. The upper die 50 can be machined, for example from a block of an aluminium alloy, a titanium alloy or a heat-resisting steel alloy. The upper die 50 has a form-defining recess 51 which has, inter alia, three inner surfaces 52 to 54. The recess 51 corresponds to the contact surfaces 39 to 41 of the top part 38 on the lower die 34 and defines the final outer surfaces of the subsequent (connecting) angle which is to be formed. The inner surfaces 52 to 54 of the lower die 34 intersect one another approximately vertically at an imaginary intersection point 55. To complete the angle, the upper die 50 is positioned onto the lower die 34 with the blank 6 mounted therein (cf. FIG. 5) and the entire structure is then compressed in a uniaxial compression moulding device (not shown) to consolidate the angle by the application of pressure. In this respect, the resiliently flexible edge suspension of the blank 6 allows an interlaminar slide and a fold-free deformation. On completion of the pressing procedure, the deformed angle still has to be shaped into a predetermined desired contour, which is usually achieved by an all-round trimming or edging operation of the angle. Furthermore, holes for mechanically attaching the deformed angle inside the fuselage cell structure of the aircraft also have to be provided. These holes can be machined, for example into the sides of the finished angle. As an alternative, both the lower die 34 and the upper die 50 can have integrated heating means to slow down the cooling of the blank. The heating means can operate electrically or by means of heated gaseous or liquid substances.

The lower die 34 is attached to a platen of a uniaxial compression moulding device (not shown in the figures), as part of the device according to the invention, while the upper die 50 is accommodated on the punch of the compression moulding device opposite the lower die 34.

Figure 7:
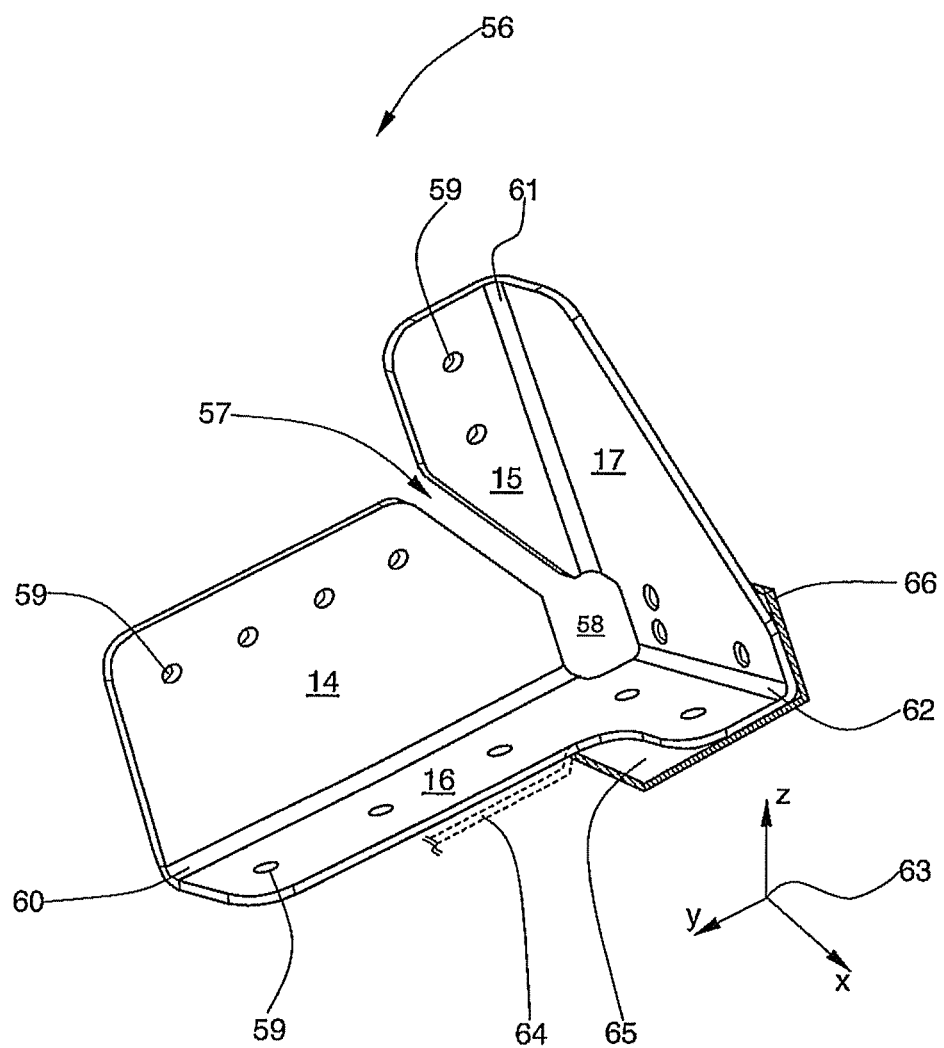
FIG. 7 is a perspective view of the deformed auto-stabilised angle.

FIG. 7 is a further perspective view of a blank 6 which has been fully deformed and trimmed or edged into an auto-stabilised (connecting) angle 56. The angle 56 has two former flanges 14, 15, a skin flange 16 and a support flange 17.

If the angle 56 is to be installed, for example in the conical tail region of a fuselage cell structure of an aircraft, it may be necessary to configure the angle between former flange 14 and skin flange 16 to be greater than 90°. In this case, it is also necessary to give the angles between the former flange 15, the support flange 17 and the skin flange 16 values other than 90°. As shown in FIG. 7, the planes of the former flanges 14, 15 on the one hand and those of the skin flange 16 and of the support flange 17 on the other hand can each stand approximately vertically against one another. Angle values differing therefrom are possible. The former flanges 14, 15 can be located in one plane or can be vertically offset and adjoin one another with a mitre of approximately 45° with the formation of a gap 57. In a departure from FIG. 7, this angle can also differ from 45°.

The support flange 17 ensures the auto-stabilisation of the angle 56 in the fuselage cell structure of the aircraft, as a result of which forces in the longitudinal direction of the aircraft (parallel to the stringers) can be absorbed by the angle 56. Located in the region of an imaginary intersection zone between the flanges or side surfaces 16 and 17 as well as 14, 15 each standing approximately vertically against one another is a square recess 58 which can also have a different geometrical shape. The skin flange 16 has overall an approximately rectangular shape, while the support flange 17 has an approximately triangular shape. The superficial extent of the two former flanges 14, 15 approximately corresponds in each case to a rectangle with a slightly bevelled edge.

A plurality of holes, one of which 59 has been provided with a reference numeral in representation of the others, is made both in the two former flanges 14, 15 and in the skin flange 16. The (attachment) holes in the skin flange 16, the former flanges 14, 15 and the support flange 17 are to mechanically attach the angle 56 inside the fuselage cell structure of the aircraft by rivet or screw connections. Alternatively however, the angle 56 can also be bonded therein, thereby rendering unnecessary structure-weakening (attachment) holes. The three deformed regions 60 to 62 resulting from the deformation procedure are each channel-shaped and can extend with portions being in a straight line or curved unidimensionally or two-dimensionally with respect to the axes of the coordinate system 63. Consequently, an optimum fit of the angle 56 is achieved inside the usually two-dimensionally (spherically) curved fuselage cell structure or the fuselage cell skin of the aircraft.

The skin flange 16 can be provided with an interspersion 64 or bead in order to ensure, regardless of the material thickness of a stringer flange 65 of a stringer 66, as full-surface contact as possible of the skin flange 16 on a fuselage cell skin (not shown) which is located in the xy-plane of the coordinate system 63.

To carry out the method according to the invention, in a first step a) a blank 6 consisting of a fibre-reinforced thermoplastic plastics material is suspended resiliently in the mounting frame 18 which is in the planar initial state using a plurality of peripherally arranged tension springs. The blank 6 already has the approximate (peripheral) contour of the subsequent angle 56 plus an encircling edge region 9 which is used for introducing retaining holes which are not shown in FIG. 7. The (retaining) holes (cf. in particular FIG. 3) are used to attach the blank 6 in the mounting frame 18.

In the following step b), the blank 6 is uniformly heated over its entire surface in a heating means, i.e. is brought to at least the plasticisation temperature of the matrix of the thermoplastic plastics material. A radiant heater or a conventional furnace, for example can be used as the heating means. Temperatures of more than 250° are required for the high-performance thermoplastic polymers used for production of the angle.

In step c), the mounting frame 18 with the blank 6 suspended therein is placed on the lower die 34 which is already arranged on a platen of a suitable compression moulding device, with the segments 19 to 22 of the mounting frame 18 preferably coming into full contact with the spacers of the lower die 34. The segments 19 to 22 are usually positioned on the lower die 34 automatically due to the dead weight of the segments 19 to 22 of the mounting frame 18, but they can also be positioned by a handling device. In this stage of the method, the mounting frame 18 is in the so-called moulding state and the blank 6 already undergoes a first partial deformation towards the subsequent final shape of the angle.

In the final step d), the press is brought together and the upper die 50 which is arranged on a punch of the uniaxial compression moulding device opposite the lower die 34 is pressed onto the lower die 34 with high contact pressure in order to conclude the deformation procedure of the blank 6 into the finished angle, including consolidation. The heating means is preferably located inside or immediately next to the compression moulding device to prevent the blank 6 from cooling down as a result of long travel paths.

The deformation process in the compression moulding device simultaneously allows the interlaminar slide inside the reinforcing fibre arrangement of the angle 56 with the provision of slightly bevelled or inclined edges (so-called "book effect"). After cooling, the angle 56 is brought into a required contour by a trimming of the edges, with the bevelled edges being removed at the same time. The attachment holes are preferably made in the angle 56 after the deformation procedure, but alternatively can also be made in the blank 6 while it is still planar.

Of major importance for the implementation of the method is the fact that between the heating of the blank 6 and the actual deformation procedure by the compression of the lower die 34 and the upper die 50, as little time as possible elapses in order to substantially prevent the blank 6 from cooling down below the plasticisation point. For this purpose, the heating means for tempering the blank 6 which is already suspended resiliently in the mounting frame 18 is preferably arranged directly inside the compression moulding device next to the lower die 34 and upper die, 50 or in very close proximity to the compression moulding device.

Thus, the connecting angle according to the invention can be rapidly produced in relatively simple, cost-effective, uniaxially operating compression moulding devices or moulding presses in large part numbers with great dimensional accuracy and reproducibility.

LIST OF REFERENCE NUMERALS 1 annular former
2 stringer
3 fuselage cell skin
4 (aluminium) angle
5 rivet
6 blank
7 outer contour (blank)
8 inner contour (angle)
9 edge region
10 hole (edge region)
11 fold line
12 fold line
13 fold line
14 former flange
15 former flange
16 skin flange
17 support flange
18 mounting frame (multi-foldable)
19 segment (frame segment)
20 segment (frame segment)
21 segment (frame segment)
22 segment (frame segment)
23 hinge
24 hinge
25 hinge
26 double arrow
27 (tension) spring
28 screw
29 pivot axis (hinge)
30 pivot axis (hinge)
31 pivot axis (hinge)
33 screw (with conical head)
34 lower die
35 side face
36 side face
37 side face
38 top part
39 contact surface
40 contact surface
41 contact surface
42 spacer
43 height (spacer)
44 retaining plate
45 retaining plate
46 end edge (retaining plate)

47 end edge (retaining plate)
48 gap
49 recess (between retaining plates)
50 upper die
51 recess
52 inner surface
53 inner surface
54 inner surface
55 intersection point (intersection region)
56 angle
57 gap
58 recess
59 (attachment) hole
60 deformed region
61 deformed region
62 deformed region
63 coordinate system
64 interspersion
65 stringer flange
66 stringer

The invention claimed is:

1. A device for the production of a component, wherein the component is deformed in a compression moulding device by the one-step deformation of a planar blank along at least three fold lines, the blank being formed from a fibre-reinforced thermoplastic plastics material, wherein a mounting frame is arranged between a lower die and an upper die and the blank is secured in the mounting frame, the mounting frame being formed by at least two segments and the at least two segments being articulated together by at least one hinge such that the at least two segments can be pivoted relative to one another by the at least one hinge, and it being possible for the mounting frame to be applied on the lower die by pivoting the at least two segments such that the mounting frame rests on the lower die and such that the at least two segments follow a peripheral contour of the lower die.

2. The device according to claim 1, wherein the blank is suspended in the mounting frame by a plurality of resilient elements.

3. The device according to claim 1, wherein the mounting frame is formed by at least four segments, the segments being articulated together by the at least one hinge.

4. The device according to claim 1, wherein the at least four segments are each approximately L shaped.

5. The device according to claim 1, wherein pivot axes of the hinges each include angles of up to 120° to one another in a moulding state of the mounting frame.

6. The device according claim 1, wherein in a planar initial state of the mounting frame, at least two pivot axes run approximately parallel to one another and at least one other pivot axis runs approximately vertically to the at least two pivot axes.

7. The device according to claim 1, wherein the lower die has substantially the shape of a polyhedron.

8. The device according to claim 1, wherein the lower die has a plurality of raised spacers for the mounting frame in order to adjust a defined height between the mounting frame and at least three side faces of the lower die.

9. The device according to claim 1, wherein provided on the lower die is a guide it being possible for a guide means arranged on the mounting frame to be introduced into the guide.

10. The device according to claim 1, wherein the lower die has a top part with at least three contact surfaces for the blank.

11. A method for the production of a component, using a device according to claim 1, comprising:
a) introduction of a planar blank, formed using a fibre-reinforced thermoplastic plastics material, into the mounting frame which has at least one hinge,
b) heating of the blank,
c) positioning of the mounting frame with at least one hinge on a lower die, the mounting frame being applied on the lower die by pivoting the segments such that the mounting frame rests on the lower die, and
d) pressing together of the lower die and an upper die in a compression moulding device.

12. The method according to claim 11, wherein the mounting frame is arranged on the lower die by pivoting at least four articulated segments of the mounting frame into a moulding state.

13. The method according to claim 11, wherein a first and a second segment of the mounting frame are initially positioned on the lower die and subsequently a third and a fourth segment are positioned on the lower die.

14. The method according to claim 11, wherein a plurality of recesses are made in the planar blank and the blank is then suspended resiliently in the mounting frame.

15. The method according to claim 11, wherein the angle is trimmed and/or attachment holes are introduced therein.

16. The device according to claim 2, wherein the resilient elements are springs.

17. The device according to claim 7, wherein the lower die has the shape of a tetrahedron.

18. The device according to claim 9, wherein the guide comprises two retaining plates for the mounting frame it being possible for a guide means to be introduced into the guide.

19. The method according to claim 14, wherein the recesses are holes and the blank is then suspended by a plurality of springs in the mounting frame.

20. The device according to claim 1, wherein the component is an angle for connecting a fuselage cell skin to an annular former of an aircraft.

* * * * *